United States Patent [19]

Naramura

[11] Patent Number: 5,722,315
[45] Date of Patent: Mar. 3, 1998

[54] SYSTEM AND DEVICE FOR GRILLING FOOD

[75] Inventor: Michiyuki Naramura, Okayama-ken, Japan

[73] Assignee: Kabushiki Kaisha Kyowa Kogyosho, Okayama-ken, Japan

[21] Appl. No.: 284,970

[22] Filed: Aug. 1, 1994

[30] Foreign Application Priority Data

Jul. 30, 1993 [JP] Japan ............................ 5-189493
Jun. 2, 1994 [JP] Japan ............................ 6-121227

[51] Int. Cl.⁶ ............................................ A47J 37/00
[52] U.S. Cl. .................... 99/349; 99/373; 99/377; 99/422
[58] Field of Search ................... 99/349, 373, 377, 99/422; 219/468, 457, 461, 464, 465, 466, 467

[56] References Cited

U.S. PATENT DOCUMENTS

| 4,144,435 | 3/1979 | Clark et al. ................. 99/DIG. 14 |
| 4,444,094 | 4/1984 | Baker et al. ........................ 99/349 |
| 4,843,218 | 6/1989 | Husslein et al. ................. 219/468 |
| 5,044,264 | 9/1991 | Forney ............................... 99/349 |
| 5,131,320 | 7/1992 | Jensen et al. ...................... 99/422 |

FOREIGN PATENT DOCUMENTS 63-163737 10/1988 Japan.
2174816 7/1990 Japan.

Primary Examiner—David Scherbel
Assistant Examiner—Reginald L. Alexander
Attorney, Agent, or Firm—Morrison Law Firm

[57] ABSTRACT

A grill plate for grilling food, and in particular, frozen meat patties, is coated with a mixture of polytetrafluoroethylene (PTFE) and a far-infrared radiation substance. The PTFE, being an abherent, prevents food from sticking to the grill plates, while the far-infrared radiation substance facilitates heating the inner portion of the food by the far-infrared radiation emitted from the far-infrared radiation substance. The entire piece of food is cooked evenly before the outer portion is overcooked.

12 Claims, 10 Drawing Sheets

SYSTEM AND DEVICE FOR GRILLING FOOD

BACKGROUND

This invention relates to a device for cooking (heating, baking, grilling, roasting, broiling and the like) food. In particular, the present invention relates to a device for grilling frozen meat patties (thin pieces of ground or minced meat, such as hamburger patties).

One type of grilling device is disclosed in Japanese Laid-Open Patent Application No. 2-174816. An upper heat plate is hinged at its edge to a lower grill plate. A gap adjusting device controls the spacing between facing surfaces of the upper heat plate and the lower grill plate according to the thickness of the material to be grilled. The lower grill plate is heated with a gas burner from beneath. The upper heat plate contains a heater. The upper heat plate presses downward on the food, thus heating the food between the upper and lower plates. Since both the sides of the food are heated directly, baked or grilled simultaneously, the food is cooked to a desired preference.

However, when frozen food material is cooked by this device, cooking is uneven and imperfect. A long grilling time cooks the inner portion of the food moderately, but overcooks the outer portion. A short grilling time cooks the outer portion as desired while leaving the inner portion only partly cooked.

The uneven cooking problem is compounded when the meat being cooked is frozen initially. Before cooking of the interior can even begin, the ice contained therein must be melted. The ice at the surface melts soon after heat is applied, but melting and heating progresses from surface to interior.

The internal temperature of food, especially meat, must be raised sufficiently high to kill harmful bacteria such as salmonella and e. coli sp. For instance, salmonella die after a few minutes exposure at 59° C. (138° F.). Pathogenic forms of e. coli, such as e. coli 0157:H7, die at approximately 71° C. (160° F.). Cooking frozen meat patties using a conventional grilling device fails to raise the temperature inside the meat patty high enough to kill harmful bacteria without overcooking the outer portion.

OBJECTS AND SUMMARY OF THE INVENTION

Accordingly, it is an object of the present invention to provide a device for grilling food by which the food can be cooked evenly as desired in a short time.

It is a further object of the present invention to make use of the thermal effects of far-infrared radiation in heating or cooking an object.

The device of the present invention includes coating a metal plate or a pair of metal plates with a mixture of a polytetrafluoroethylene (PTFE), such as is sold under the registered trademark "TEFLON", and a far-infrared radiation substance, such as alumina titania. The coated metal plate is used as a heating surface which makes contact with food. In other words, the coated metal plate is used as a grill plate. Food is pressed and heated between the coated surfaces of the pair of grill plates. It is also possible to place a layer of far-infrared radiation substance between the coating and the metal plate to enhance the thermal effects of the far-infrared radiation.

Food easily separates from the grill plate since PTFE is an abherent. Even if a PTFE coating is relatively thick (for example, about 100 µm), the amount of the far-infrared radiation from the PTFE coating does not seriously decrease. Instead of a coating, a sheet of the PTFE mixture can be affixed to the metal plate. The PTFE sheet is easily removed from the metal plate and replaced with a new sheet when necessary. When a far-infrared radiation substance layer is added between the PTFE sheet and the metal plate, increased thermal benefit from far-infrared radiation results.

Briefly stated, the present invention provides a grill plate for grilling food, and in particular, frozen meat patties, coated with a mixture of polytetrafluoroethylene (PTFE) and a far-infrared radiation substance. The PTFE, being an abherent, prevents food from sticking to the grill plates, while the far-infrared radiation substance facilitates heating the inner portion of the food by the far-infrared radiation emitted from the far-infrared radiation substance. The entire piece of food can be evenly cooked before the outer portion is overcooked.

According to an embodiment of the invention, there is provided an apparatus for heating an object, comprising: means for storing a plurality of the objects, a first grill plate having a first grilling surface thereon, a second grill plate having a second grilling surface thereon, the first grilling surface being aligned with, and facing, the second grilling surface, means for moving one of the plurality of objects from the means for storing to a position between the first grilling surface and the second grilling surface, a layer on at least one of the first grilling surface and the second grilling surface, the layer including a mixture of polytetrafluoroethylene and a far-infrared radiation substance, and means for moving the layer into contact with a surface of the object. The means for moving said layer can further include pressing the object between the first and second grilling surfaces.

According to a feature of the invention, there is provided a grill plate for heating an object, comprising: a metal plate, a layer on the metal plate, the layer including a mixture of polytetrafluoroethylene (PTFE) and a far-infrared radiation substance, a heater in thermal contact with the metal plate for heating the metal plate to a heating temperature, and means for contacting the layer with the object.

According to a further feature of the invention, there is provided a grill plate for grilling a food material, comprising: two metal plates, a heater between the two metal plates, and at least one of the metal plates having a layer of a far-infrared radiation substance.

According to a still further feature of the invention, there is provided a grill plate for grilling a food material, comprising: a metal box, a resistive heating element inside the metal box, a layer of a far-infrared radiation substance on a surface of the metal box, and the layer being positioned for contact with the food material.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT(S)

Figure 1:
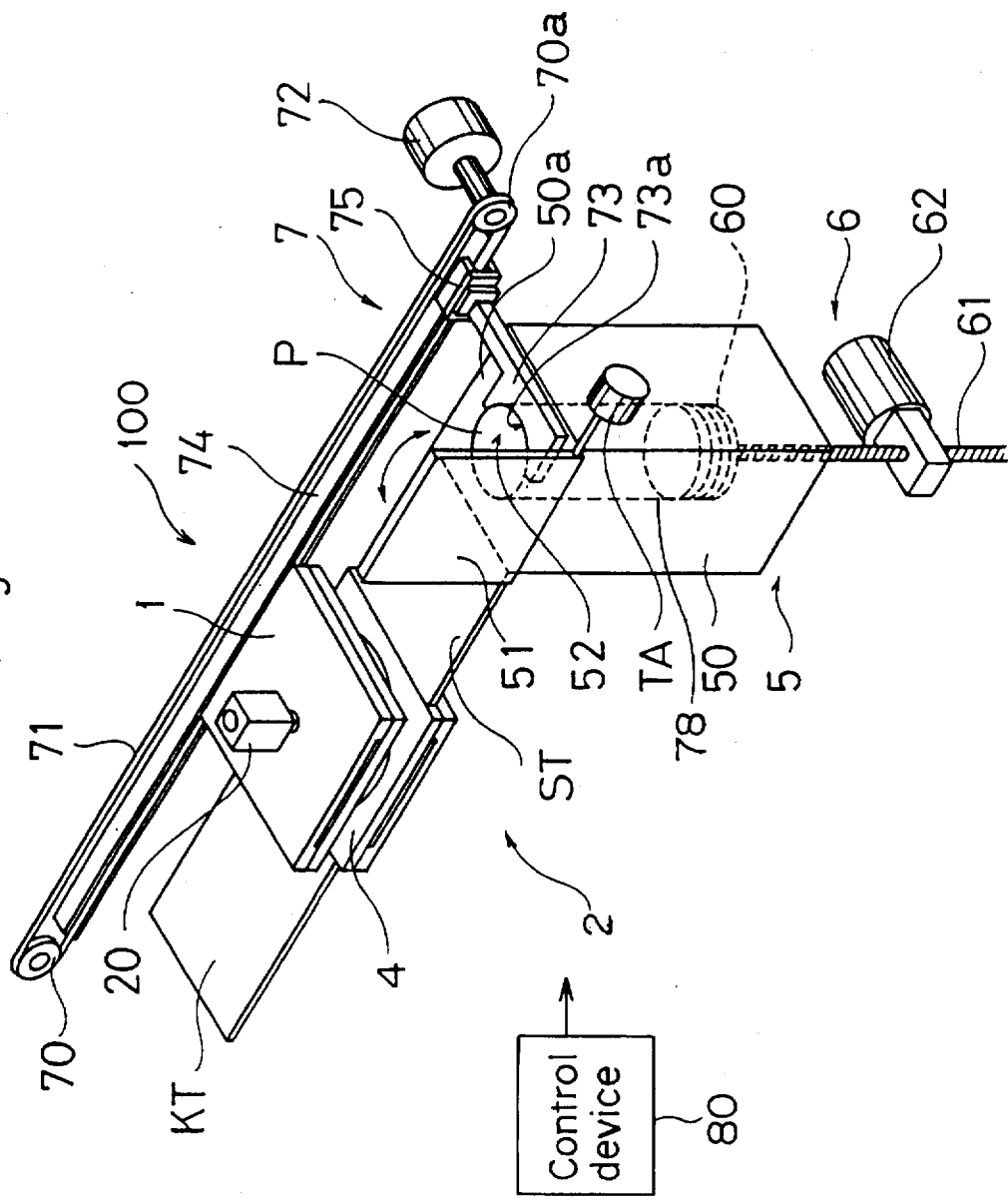
FIG. 1 is a perspective view of a frozen meat patty grilling system including a grilling device according to an embodiment of the present invention.

Referring to FIG. 1, a frozen meat patty grilling system, shown generally at 100, includes a patty grilling device 2 having a lower grill plate facing an upper grill plate 1 across a gap. An elevating cylinder 20 displaces upper grill plate 1 upward for insertion of material to be cooked, and downward to a predetermined spacing from lower grill plate 4 for cooking. In this embodiment, the spacing is such that the material is pressed between upper grill plate 1 and lower grill plate 4.

A slide table ST is positioned between patty grilling device 2 and a freezer stocker 5. Freezer stocker 5 includes a box casing 50 for containing a magazine 78. Magazine 78 is a removable and replaceable device for restocking a stack of items to be stored, and later cooked such as, for example, meat patties P. Meat patties P are supported on a patty tray 60. An elevation of patty tray 60, and thus of meat patties P, is controlled by a motor 62 which rotates a nut (not shown) engaging a screw rod 61.

A patty discharge port 52 in a top surface 50a of box casing 50, has a size and shape slightly larger than the size and shape of meat patties P. The interior of box casing 50 is refrigerated, to keep meat patties P chilled or frozen. The close match between the sizes of patty discharge port 52 and meat patties P prevents substantial leakage of heat into box casing 50, and thereby conserves refrigeration energy. A hinged lid 51 is controlled by a torque actuator TA between a closed position, in which it covers patty discharge port 52, and an open position shown, in which it uncovers patty discharge port 52.

For convenience, meat patties P may be installed in box casing 50 using magazine 78. Thus, when meat patties P in one magazine 78 become depleted, a filled magazine 78 may be substituted quickly. Alternatively, a stack of meat patties P may be stacked onto patty tray 60 manually.

A conveyor device 7 moves a top patty P from freezer stocker 5, sliding it along slide table ST and onto a position centered on lower grill plate 4. Conveyor device 7 includes a pushing arm 73 having a curved part 73a facing freezer stocker 5. Pushing arm 73 is connected to a holder 75 connected to a run of a belt 71. Belt 71 is reeved over a driven pulley 70a and an idler pulley 70. Driven pulley 70a is affixed to a shaft of a motor 72. A plate guide 74 extends alongside, and parallel to, belt 71. Holder 75 includes an arm extending therefrom engaging plate guide 74. The engagement of the arm of holder 75 with plate guide 74 ensures that holder 75 travels in a substantially straight path.

A completion table KT extends beyond patty grilling device 2.

A control device 80 controls and coordinates the activation of motor 60, motor 72, torque actuator TA, and elevating cylinder 20, as well as the heating functions, to be explained, to control the movement and heating of frozen meat patty grilling system 100 through its cycles.

In operation, torque actuator TA rotates hinged lid 51 into the open position. Motor 62 drives the nut (not shown) engaging screw rod 61 a rotational amount sufficient to advance screw rod 61 upward by a distance substantially equal to the thickness of one meat patty P. At this position, the bottom of the uppermost meat patty P is slightly higher than top surface 50a. Elevating cylinder 20 raises upper grill plate 1 an amount sufficient to permit clearance for entry of meat patty P. Motor 72 is energized to move pushing arm 73 toward the left in the figure. Curved part 73a engages the edge of the uppermost meat patty P, thereby pushing it toward the left, and sliding it along the surface of slide table ST until it is centered between lower grill plate 4 and upper grill plate 1. Motor 72 moves pushing arm 73 rightward a slight distance to clear patty grilling device 2. Finally, elevating cylinder 20 moves upper grill plate 1 downward to a position contacting the upper surface of meat patty P located between it and lower grill plate 4.

Upon completion of a grilling time, whose end may be determined by a temperature sensor or by time, elevating cylinder 20 raises upper grill plate 1 to its upper position. Motor 72 moves pushing arm 73 leftward again to push the now-cooked meat patty P from between lower grill plate 4 and upper grill plate 1 onto completion table KT. The cooked meat patty P may be removed by a spatula from completion table KT, or otherwise prepared for its final use.

If pushing arm 73 is made of a heat-resistant material, such as a metal, and is thin enough to avoid interference with the operation of upper grill plate 1, the intermediate step of moving pushing arm 73 from between upper grill plate 1 and lower grill plate 4 during cooking may be omitted. That is, pushing arm 73 may push the top patty P between upper grill plate 1 and lower grill plate 4, and may remain stationary in that position while cooking proceeds. After cooking is completed, pushing arm 73 may then resumes its pushing action to push the cooked meat patty P onto completion table KT.

Hinged lid 51 is raised by torque actuator TA to permit clearance for pushing arm 73 to travel over patty discharge port 52 to its starting position to the right of patty discharge port 52. Motor 62 is actuated to raise patty tray 60 a distance equal to the thickness of one meat patty P. Thus the starting conditions for the next operation is set up.

Figure 2:
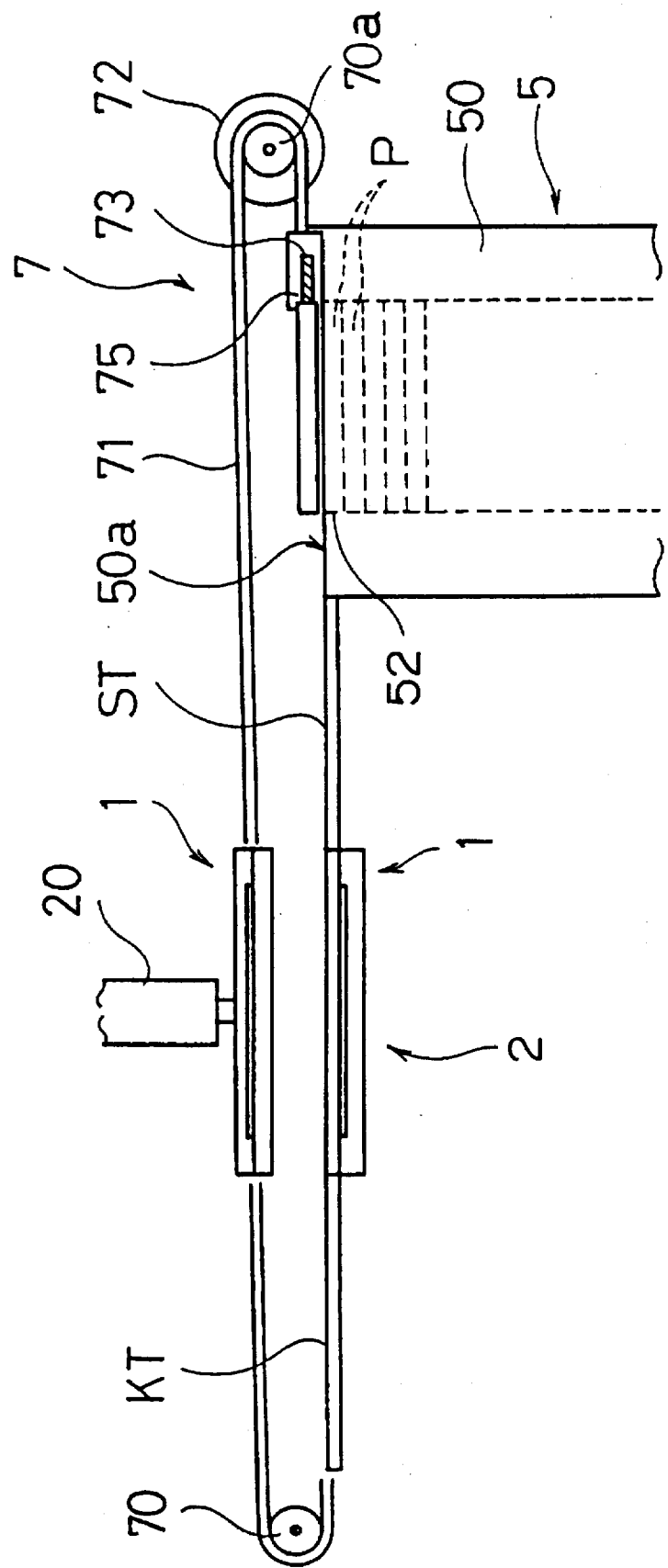
FIG. 2 is a side view of the frozen meat patty grilling system.

Referring now to FIG. 2, the starting condition of cooking a meat patty is shown. The uppermost meat patty P is raised until its bottom surface is just higher than top surface 50a. Thus, when pushing arm 73 is moved toward the left, the uppermost meat patty P is slid off its next lower neighbor, which is restrained from motion by the close fit of patty discharge port 52.

Figure 11:
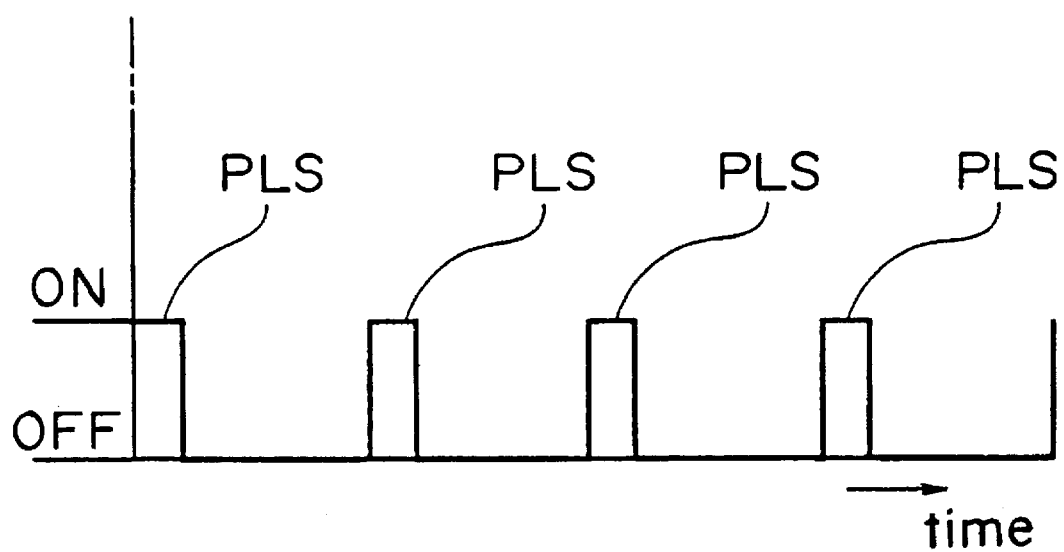
FIG. 11 is a pulse diagram of electric pulses for heating a grill plate where the pulses are small in width.

Upper grill plate 1 and lower grill plate 4 are preferably heated by embedded electric resistance heaters although any heat source may be used. A relatively large difference in power consumption exists between times when cooking is being conducted and when cooking is not being conducted. Control device 80 controls the energy fed to the electric resistance heater so as to maintain a desired temperature. In one embodiment of the invention, the electric energy is varied by pulse-width modulating a fixed-voltage power source to the resistance heaters. Referring to FIG. 11, when cooking is not being conducted, the surfaces of upper grill plate 1 and lower grill plate 4 are maintained at the desired temperature by relatively narrow pulses PLS from a fixed voltage source.

Figure 10:
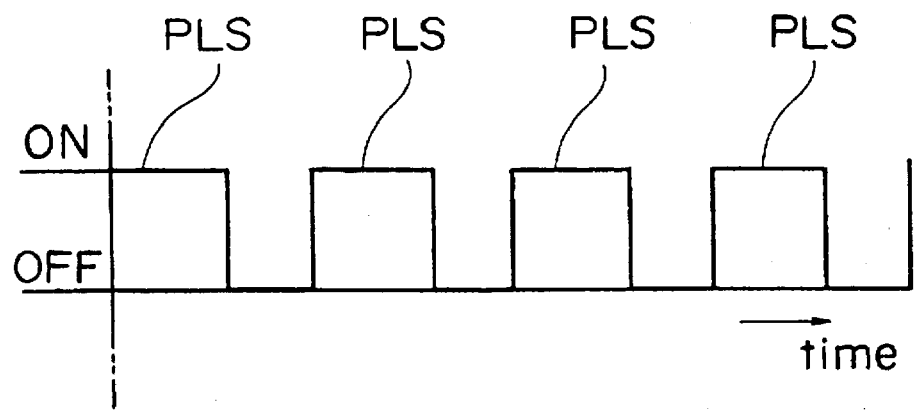
FIG. 10 is a pulse diagram of electric pulses for heating a grill plate where the pulses are large in width.

Referring now to FIG. 10, when cooking is being conducted, more energy is required to overcome evaporative cooling, and to supply the heat necessary to thaw the meat patty, and to raise its temperature the desired amount. The extra energy is supplied from the same fixed voltage source by wider pulses PLS.

In one embodiment of the invention, described as an open-loop embodiment, fixed values of pulse width are used for the cooking and non-cooking operations. In a more preferred embodiment, at least one conventional temperature sensor provides a temperature signal to control device 80. Control device 80 thereupon controls the pulse width over a range of values to maintain the temperature in commanded range.

Several additional conventional feedback signals may be generated to assist control device 80 in controlling the operation of frozen meat patty grilling system 100. For example, an electro-optical or electrical device may be used to determine the open/closed status of hinged lid 51. Similarly, such devices may be used to sense the arrival of the upper surface of the leading meat patty P in the proper elevation position, the arrival of meat patty P in a position centered between upper grill plate 1 and lower grill plate 4, the arrival of meat patty P in a desired end position on completion table KT and the arrival of pushing arm 73 back at the starting position in preparation for the next cooking operation. Since such feedback devices, and the manner in which feedback signals therefrom are used to control a sequence of operations are well known, detailed illustration and description thereof is omitted.

Figure 3:
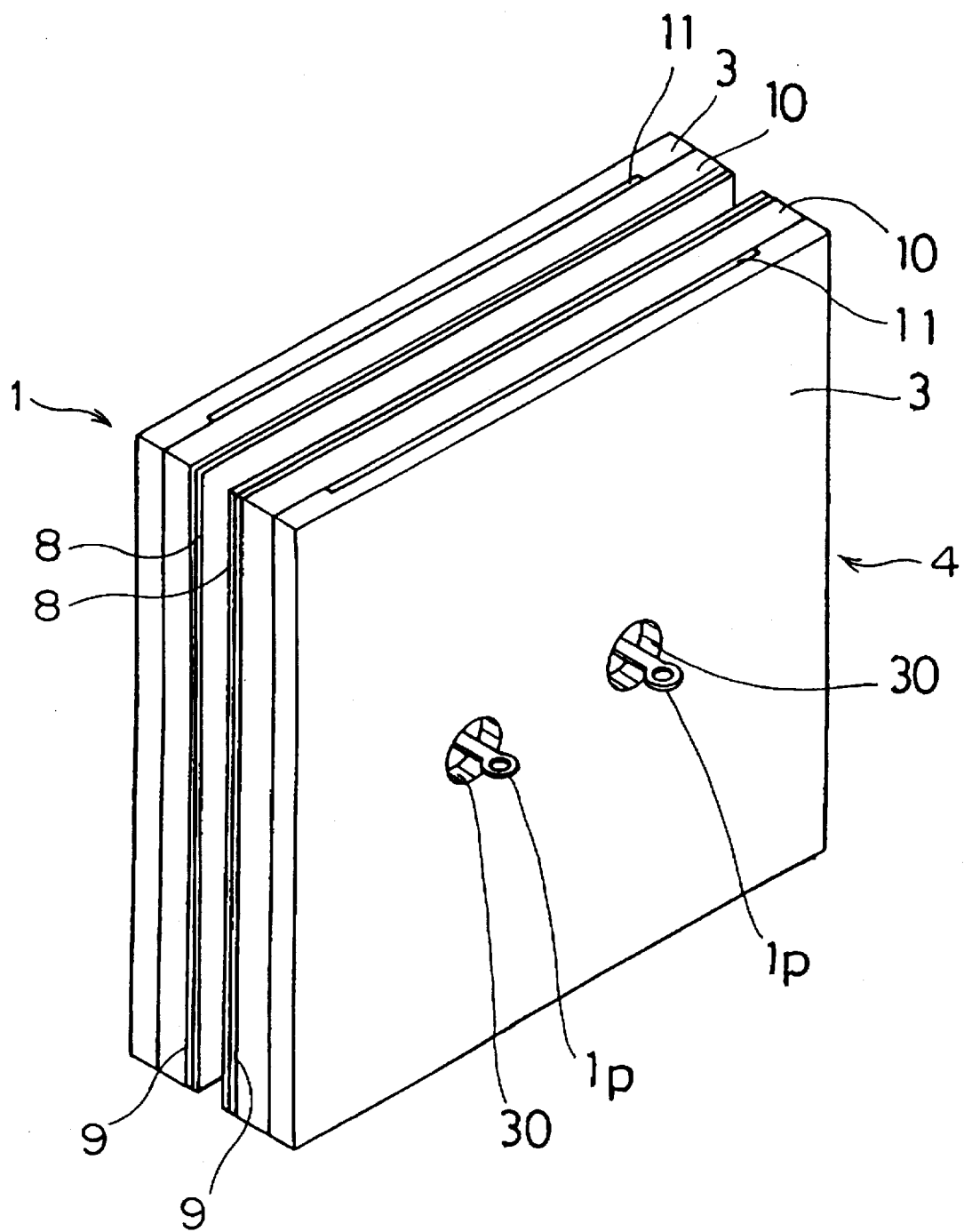
FIG. 3 is a perspective view of grill plates of the frozen meat patty grilling device according to an embodiment of the present invention.

Referring now to FIG. 3, upper grill plate 1 and lower grill plate 4 are shown facing each other. In the preferred embodiment, upper grill plate 1 and lower grill plate 4 are identical, thus only upper grill plate 1 will be described in detail.

Figure 5:
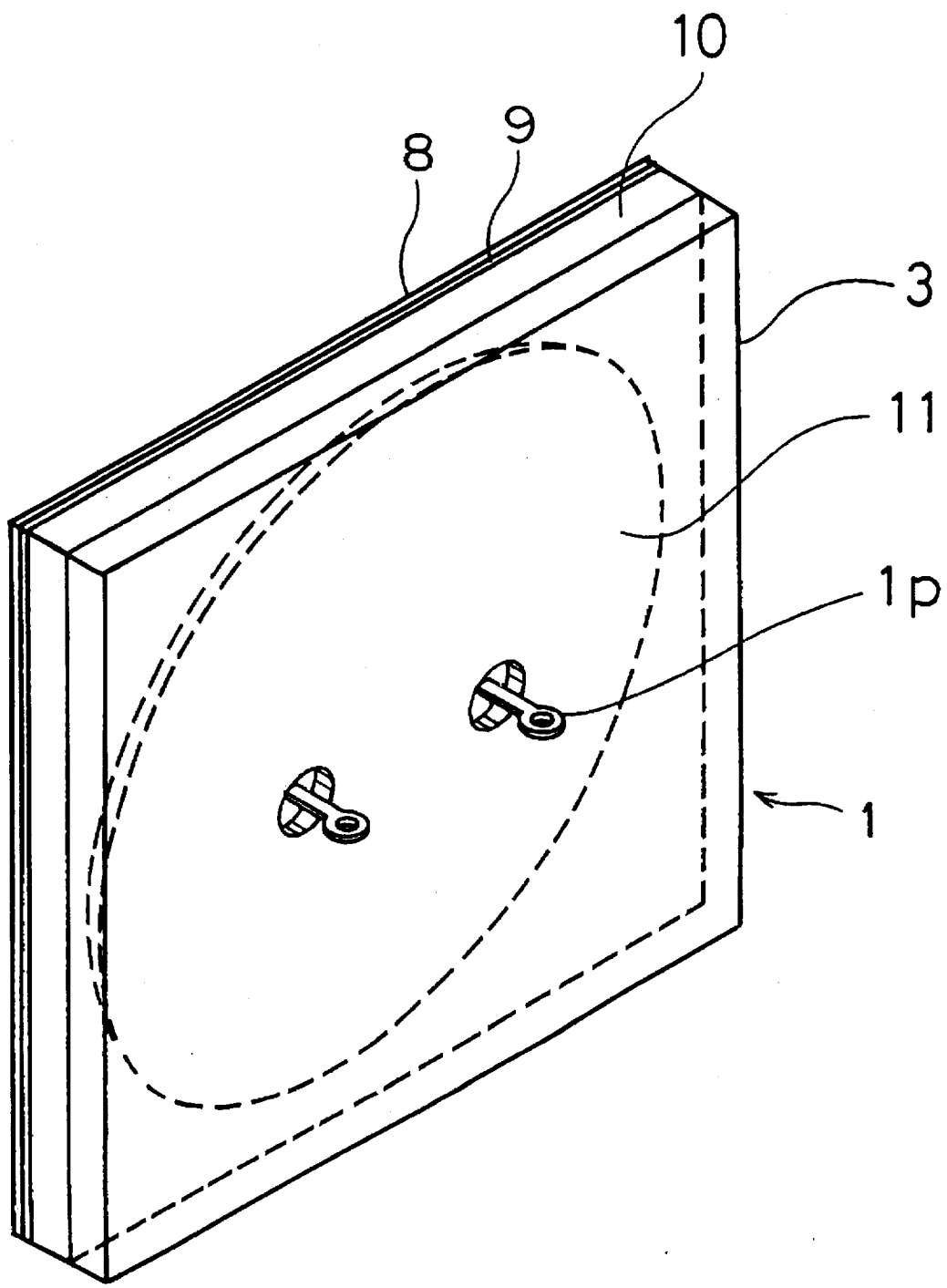
FIG. 5 is a perspective view of one of the grill plates shown in FIG. 3.

Referring now to FIG. 5, upper grill plate 1 includes a heat reserving plate 3. A metal plate 10 is affixed to a surface of heat reserving plate 3. A plate heater 11 is sandwiched between heat reserving plate 3 and metal plate 10. First and second terminals 1p of plate heater 11 extend through penetration holes 30 of heat reserving plate 3 to permit connection to a power source (not shown).

A layer 9 is sprayed or otherwise affixed to the outer surface of metal plate 10. Layer 9 consists of a far-infrared radiation substance such as $Al_2O_3+TiO_2$ (alumina titania). Far-infrared radiation has significant thermal effects and the far-infrared radiation band covers the wavelengths from 15 μm–1,000 μm. A PTFE (TEFLON) coating 8 is coated over layer 9. Coating 8 includes a powder of far-infrared radiation substance mixed therein. The mixing ratio of far infrared radiation substance to PTFE material in coating 8 is preferably about 10%. Instead of a coating, a sheet of such mixture may be affixed. Coating 8 makes contact with a surface of patty P during cooking.

Metal plate 10 is made of any metal having a high heat conductivity such as copper or aluminum and is approximately 5 mm thick.

Heat reserving plate 3 is made of copper or other metal and is about 5 mm in thickness. An outside surface of heat reserving plate 3 preferably includes an insulating layer on its outer surface (not shown) to reduce heat loss.

In the preferred embodiment, heat reserving plate 3 includes a recess therein for accepting plate heater 11.

Figure 4:
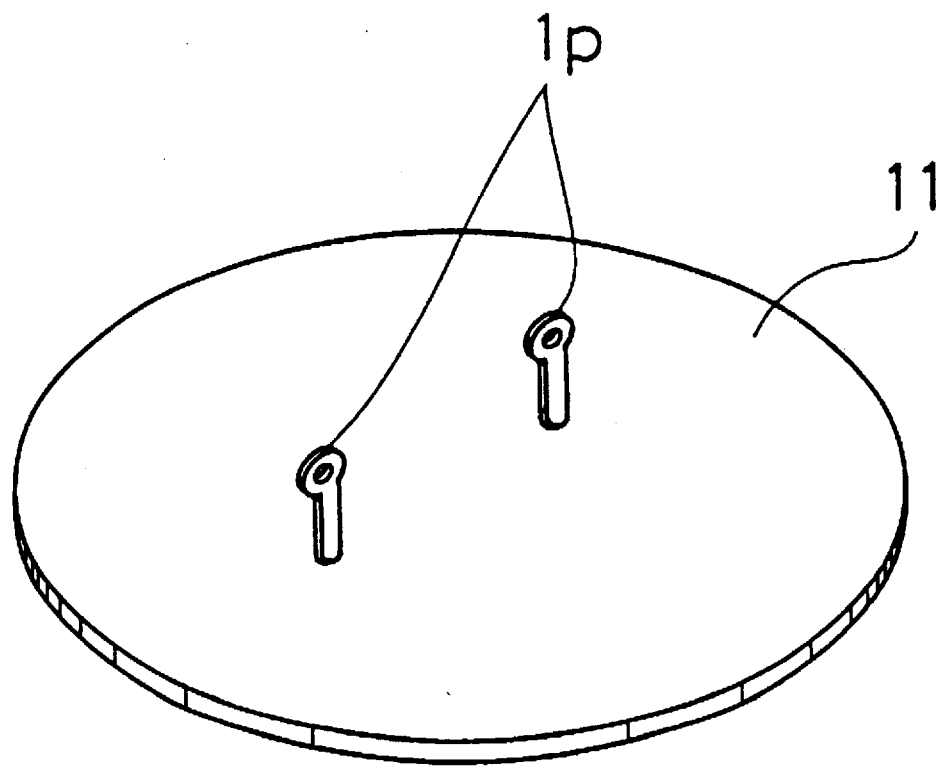
FIG. 4 is a perspective view of a plate heater used in the frozen meat patty grilling device according to an embodiment of the present invention.

Referring now to FIG. 4, one embodiment of plate heater 11 takes the form of a disk having resistance heating elements incorporated therein.

Figure 6:
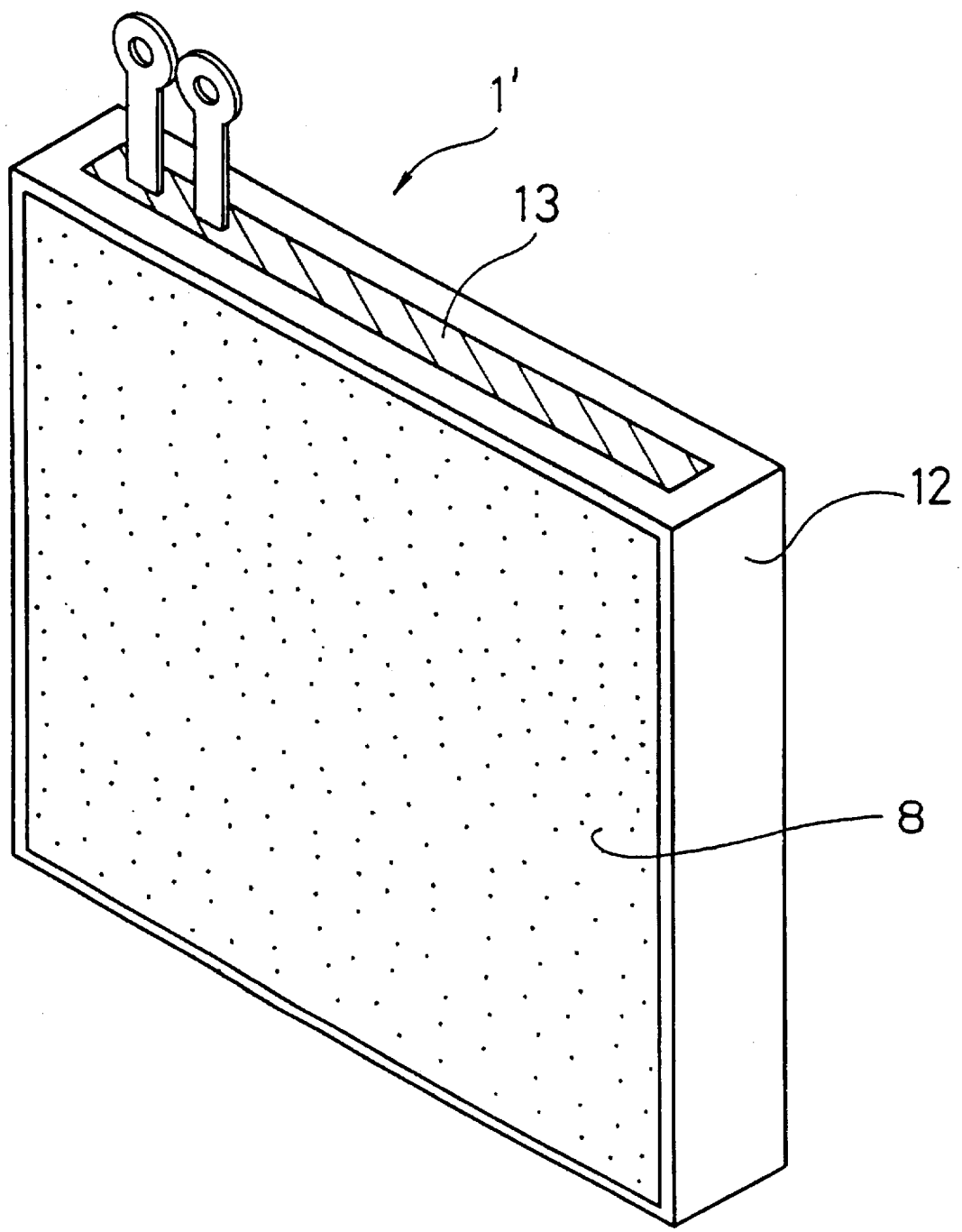
FIG. 6 is a perspective view of an alternative embodiment of a grill plate.

Referring now to FIG. 6, a further embodiment of an upper grill plate 1' includes a metal box 12 into which a heating element 13 is inserted or molded. Coating 8, covering layer 9 (not shown in FIG. 6), is coated on a surface of metal box 12. As in the previous embodiment, coating 8 faces its companion lower grill plate (not shown). Heating element may be, for example, a ceramic element cast in place over a metallic resistance heating elements to form a unitary heater in the manner of a resistance heater sold under the trademark CERMET.

Figure 7:
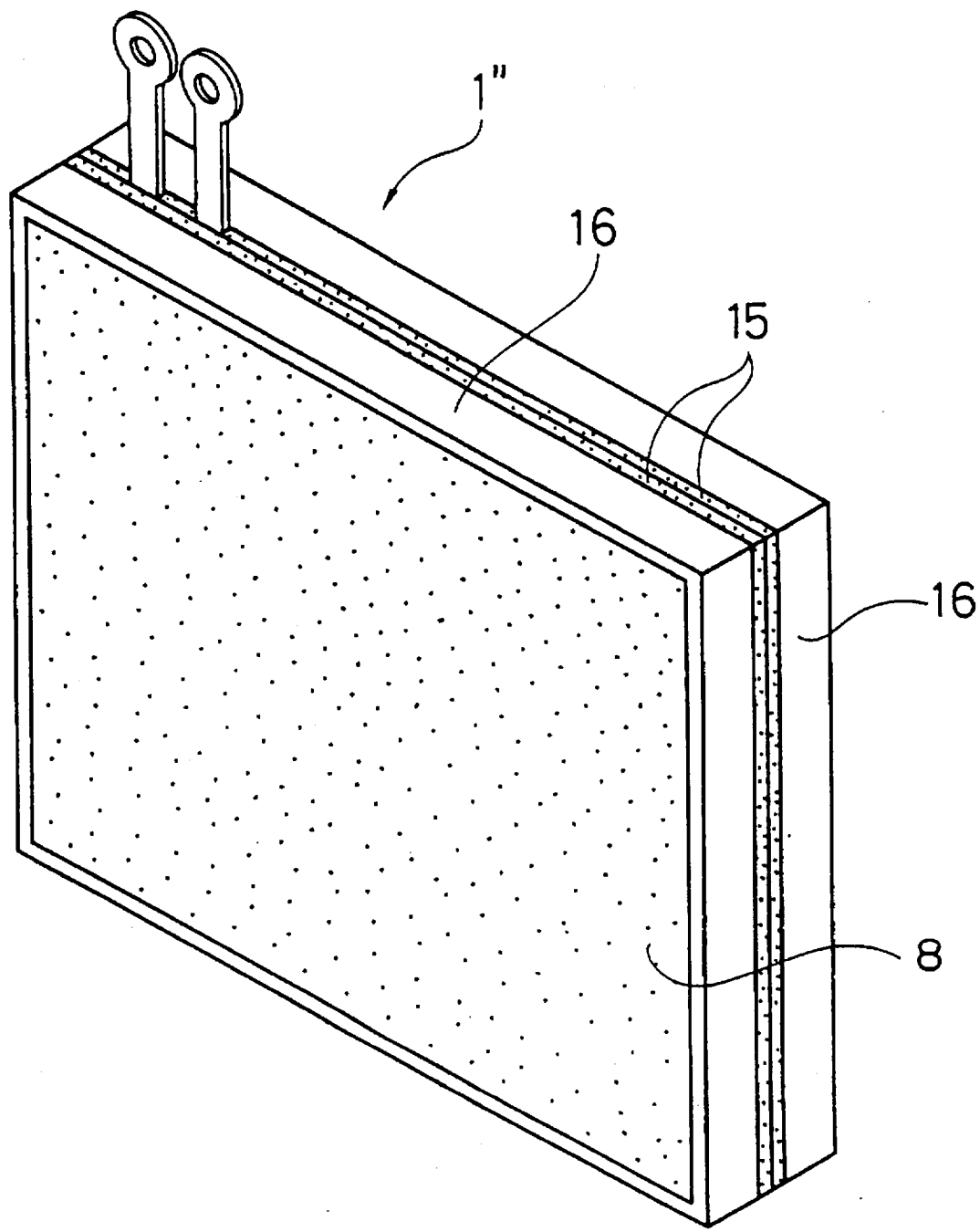
FIG. 7 is a perspective view of an alternative embodiment of a grill plate.

Referring now to FIG. 7, a still further embodiment of an upper grill plate 1" includes metal plates 16 sandwiching first and second plates of insulators 15 between them. A resistive heating element (not shown in FIG. 7) between insulators 15 provides the heat required for cooking.

Insulators 15 may be of any convenient material such as, for example, ceramic or mica.

Figure 8:
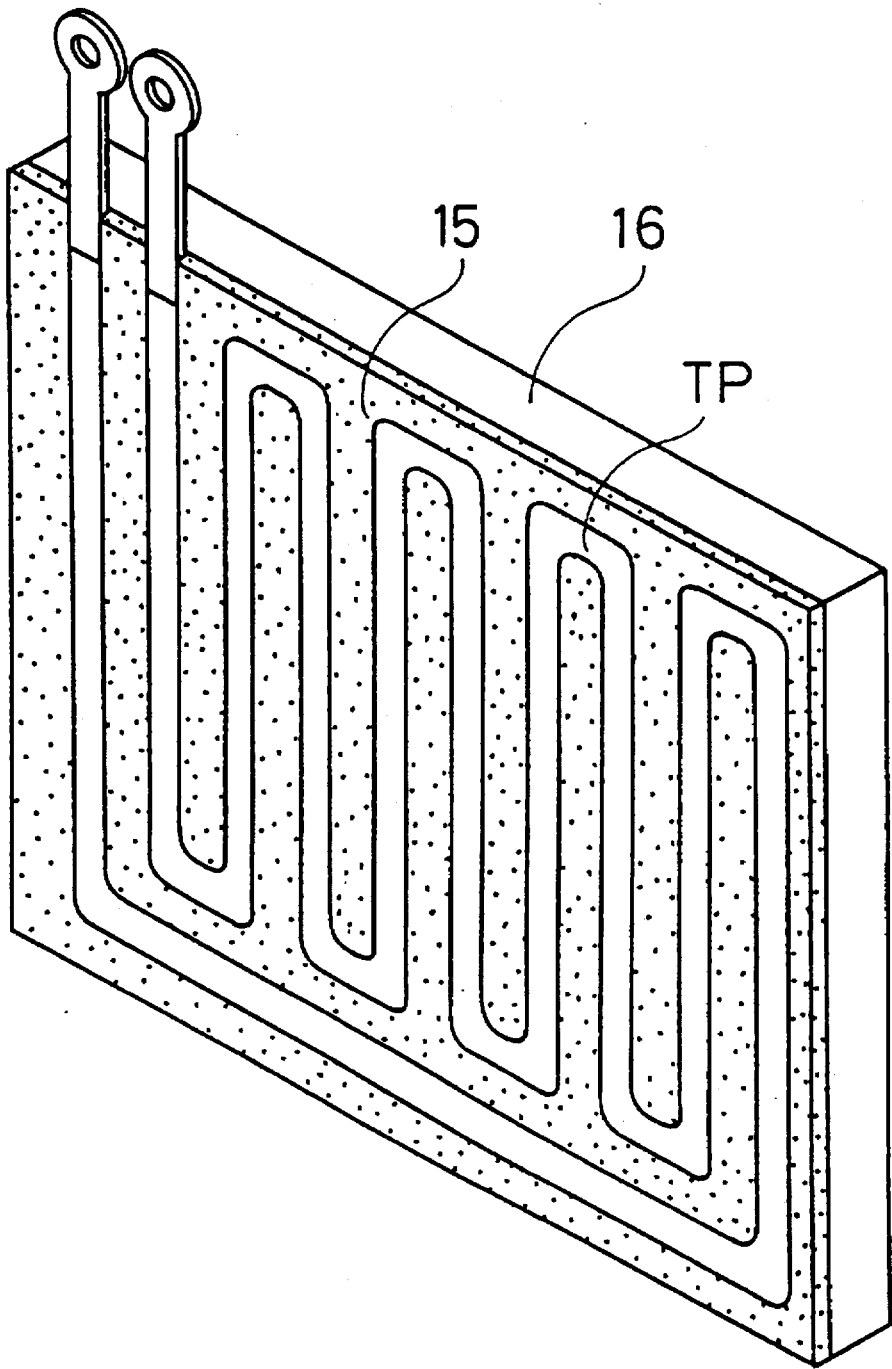
FIG. 8 is a cutaway perspective view of the grill plate of FIG. 7.
Figure 9:
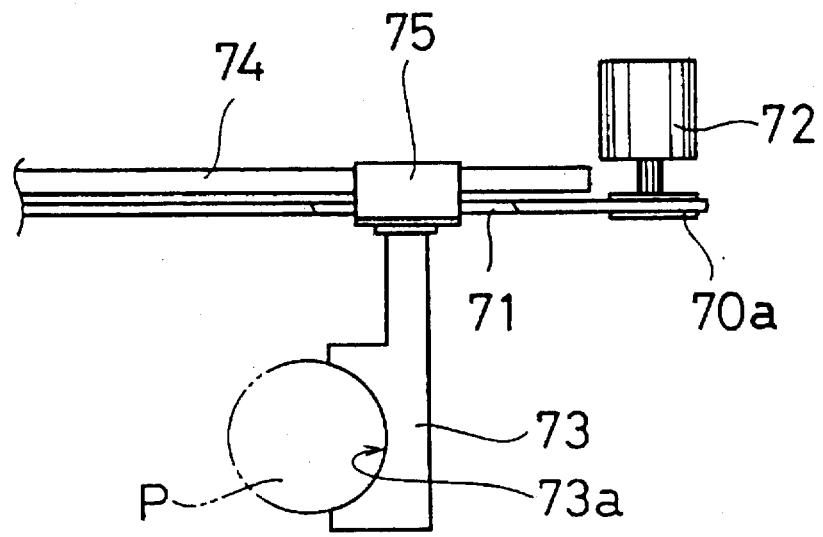
FIG. 9 is a top view of parts of the frozen meat patty grilling system.

Referring now to FIG. 8, a resistor pattern TP, is coated by any convenient method onto an inner surface of one of insulators 15. A serpentine pattern, as shown, is convenient for providing a long resistance path, as well as for providing uniform distribution of heat. Coating may be performed by silk screening a suitable resistive slurry onto insulator 15. After coating, the pattern is dried and cured. Alternatively, resistor pattern TP may be formed by applying a solid layer of a resistive material to the surface of insulator 15, and chemically etching away unwanted portions.

Instead of the printed or etched resistor pattern TP of FIG. 8, a serpentine pattern of nickel-chromium wires may be sandwiched between insulator 15.

In this embodiment, the food to be heated and grilled is a circular frozen meat patty. The invention is not limited to meat patties, or to frozen articles. Various other types of foods and food material, frozen or unfrozen, can be similarly grilled evenly in a short time.

The PTFE sheet in this embodiment is formed by diffusing and mixing a powder of a far infrared radiation substance such as alumina titania ($Al_2O_3+TiO_2$) and affixing it to both upper grill plate 1 and lower grill plate 4. However, in some embodiments only one of the plates may require such a PTFE sheet.

Moreover, the present invention may be used with a griddle for single sided cooking. Only one grill plate, as for example shown in FIG. 5, would be used to form a griddle or frying pan.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An apparatus for heating an object, comprising:
   means for storing a plurality of said objects;
   a first grill plate having a first grilling surface thereon;
   a second grill plate having a second grilling surface thereon;
   said first grilling surface being aligned with, and facing, said second grilling surface;

means for moving one of said plurality of objects from said means for storing to a position between said first grilling surface and said second grilling surface;

a layer on at least one of said first grilling surface and said second grilling surface;

said layer including a mixture of polytetrafluoroethylene and a far-infrared radiation substance; and means for moving said layer into contact with a surface of said object.

2. An apparatus according to claim 1, wherein said means for moving said layer further includes pressing said object between said first and second grilling surfaces.

3. An apparatus according to claim 1, wherein said far-infrared radiation substance includes alumina titania.

4. An apparatus according to claim 1, wherein said mixture includes about ten percent of said far-infrared radiation substance and ninety percent of said polytetrafluoroethylene.

5. An apparatus according to claim 1, wherein said means for storing includes:

a freezer stocker;

means in said freezer stocker for supporting said plurality of objects; and dispensing means for moving one of said objects into a delivery position from which it becomes displaceable to said position.

6. An apparatus for heating an object comprising:

means for storing a plurality of said objects;

a first grill plate having a first grilling surface thereon;

a second grill plate having a second grilling surface thereon;

said first grilling surface being aligned with, and facing, said second grilling surface;

means for moving one of said plurality of objects from said means for storing to a position between said first grilling surface and said second grilling surface;

a layer on at least one of said first grilling surface and said second grilling surface;

said layer including a mixture of polytetrafluoroethylene and a far-infrared radiation substance; and means for moving said layer into contact with a surface of said object;

said means for storing including a freezer stocker; means in said freezer stocker for supporting said plurality of objects; and dispensing means for moving one of said objects into a delivery position from which it becomes displaceable to said position; and said dispensing means including said means for supporting including means for supporting a stack of said objects in a concentric array in said freezer stocker; a movable tray; means for displacing said tray in incremental steps; and each of said incremental steps being substantially equal to a dimension of one of said objects, whereby after each incremental step, a leading one of said objects is moved into said delivery position.

7. Apparatus according to claim 1, wherein said means for moving includes:

means for delivering one of said objects to a delivery location;

a surface between said delivery location and said position; and means for pushing said object along said surface from said delivery location to said position.

8. An apparatus according to claim 7, wherein said means for pushing includes:

a first pulley;

a second pulley;

a belt extending between said first and second pulleys;

a motor connected to said first pulley for driving said belt; and a pushing arm affixed to said belt.

9. An apparatus according to claim 8, wherein:

said pushing arm is thinner than one of said objects; and said pushing arm is curved on a front side to conform substantially with a contour of said object.

10. A grilling device for heating an object, comprising:

a first grill plate having a first grilling surface thereon;

a second grill plate having a second grilling surface thereon;

said first grilling surface being aligned with, and facing, said second grilling surface;

a layer on at least one of said first grilling surface and said second grilling surface;

said layer including a mixture of polytetrafluoroethylene and a far-infrared radiation substance; and means for moving said layer into contact with a surface of said object.

11. A grilling device according to claim 10, wherein said layer is a sheet affixed to said at least one of said first and second grilling surfaces.

12. A grilling device according to claim 10, wherein said means for moving said layer includes pressing said object between said first and second grilling surfaces.

* * * * *